United States Patent
Ohashi et al.

(10) Patent No.: US 11,743,725 B2
(45) Date of Patent: Aug. 29, 2023

(54) COMMUNICATION SYSTEM

(71) Applicant: KABUSHIKI KAISHA TOKAI RIKA DENKI SEISAKUSHO, Aichi (JP)

(72) Inventors: Yosuke Ohashi, Aichi (JP); Keita Sobue, Aichi (JP); Shingo Mochizuki, Aichi (JP); Norihiro Shimizu, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 212 days.

(21) Appl. No.: 17/207,929

(22) Filed: Mar. 22, 2021

(65) Prior Publication Data

US 2021/0297856 A1    Sep. 23, 2021

(30) Foreign Application Priority Data

Mar. 23, 2020  (JP) ................. 2020-051349

(51) Int. Cl.
*H04W 12/069* (2021.01)
*H04W 12/04* (2021.01)
*H04W 60/00* (2009.01)

(52) U.S. Cl.
CPC ......... *H04W 12/069* (2021.01); *H04W 12/04* (2013.01); *H04W 60/00* (2013.01)

(58) Field of Classification Search
CPC ... H04W 12/069; H04W 12/04; H04W 60/00; H04W 8/005
See application file for complete search history.

(56) References Cited

U.S. PATENT DOCUMENTS

| | | | | |
|---|---|---|---|---|
| 7,561,694 | B1* | 7/2009 | Chakrabarti | H04L 63/104 713/171 |
| 9,242,618 | B2 | 1/2016 | Kawai et al. | |
| 2010/0161974 | A1* | 6/2010 | Lee | G06Q 10/10 380/279 |
| 2012/0324218 | A1* | 12/2012 | Duren | H04L 9/0827 713/162 |
| 2013/0116860 | A1 | 5/2013 | Kawai et al. | |
| 2017/0118015 | A1* | 4/2017 | Kwak | G05B 15/02 |

FOREIGN PATENT DOCUMENTS

JP    2013-100645 A    5/2013

* cited by examiner

*Primary Examiner* — Mazda Sabouri
(74) *Attorney, Agent, or Firm* — Greenblum & Bernstein, P.L.C.

(57) ABSTRACT

A communication system includes a plurality of apparatuses each performing wireless communication with a mobile apparatus. Each of the plurality of apparatuses performs authentication processing for determining whether the mobile apparatus is a mobile apparatus registered beforehand. At least one apparatus of the plurality of apparatuses performs registration processing for obtaining mobile key information to be used for the authentication processing from the mobile apparatus and registering the mobile key information, and sharing processing for transmitting the mobile key information obtained by the registration processing to the other apparatus.

9 Claims, 6 Drawing Sheets

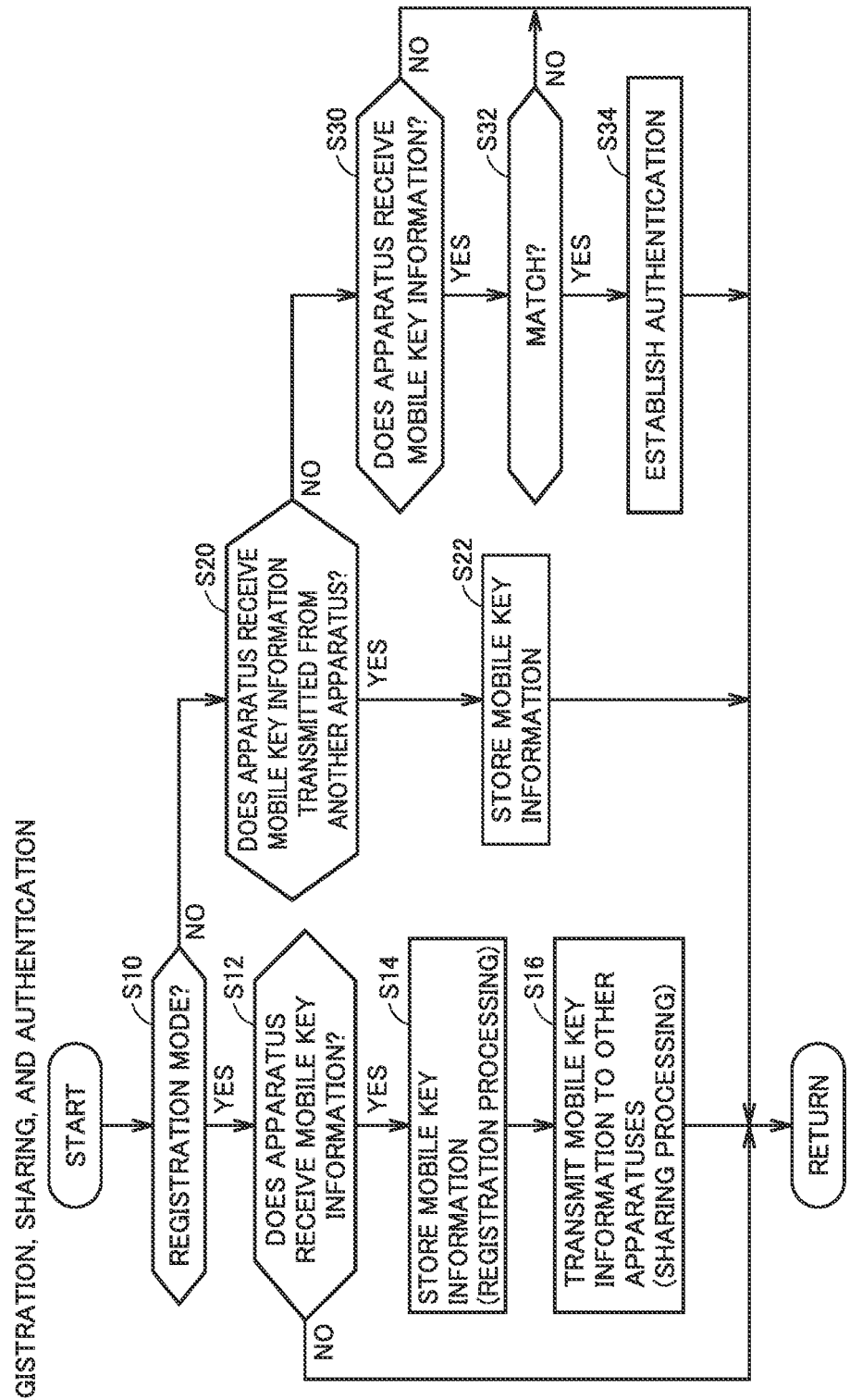

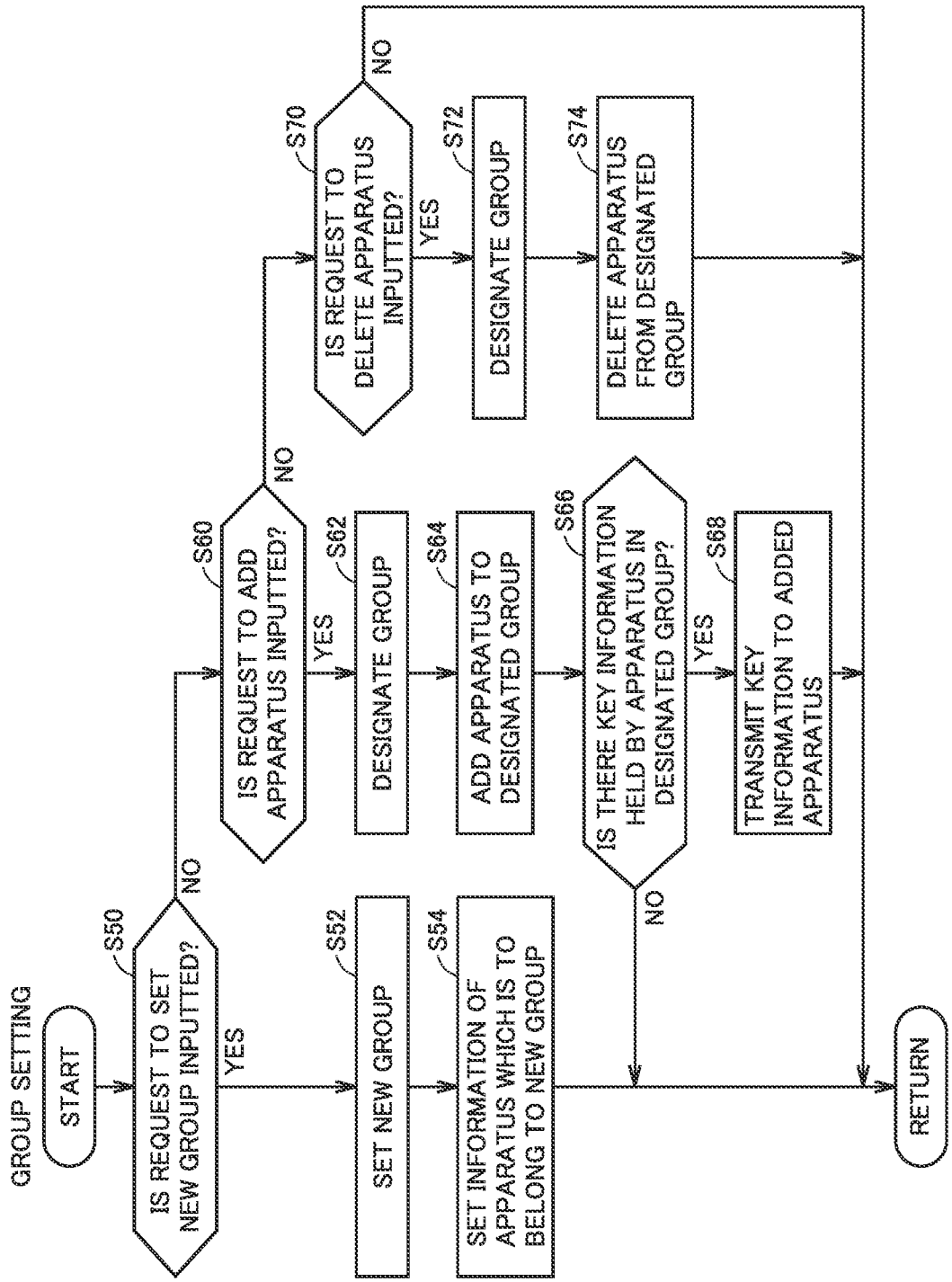

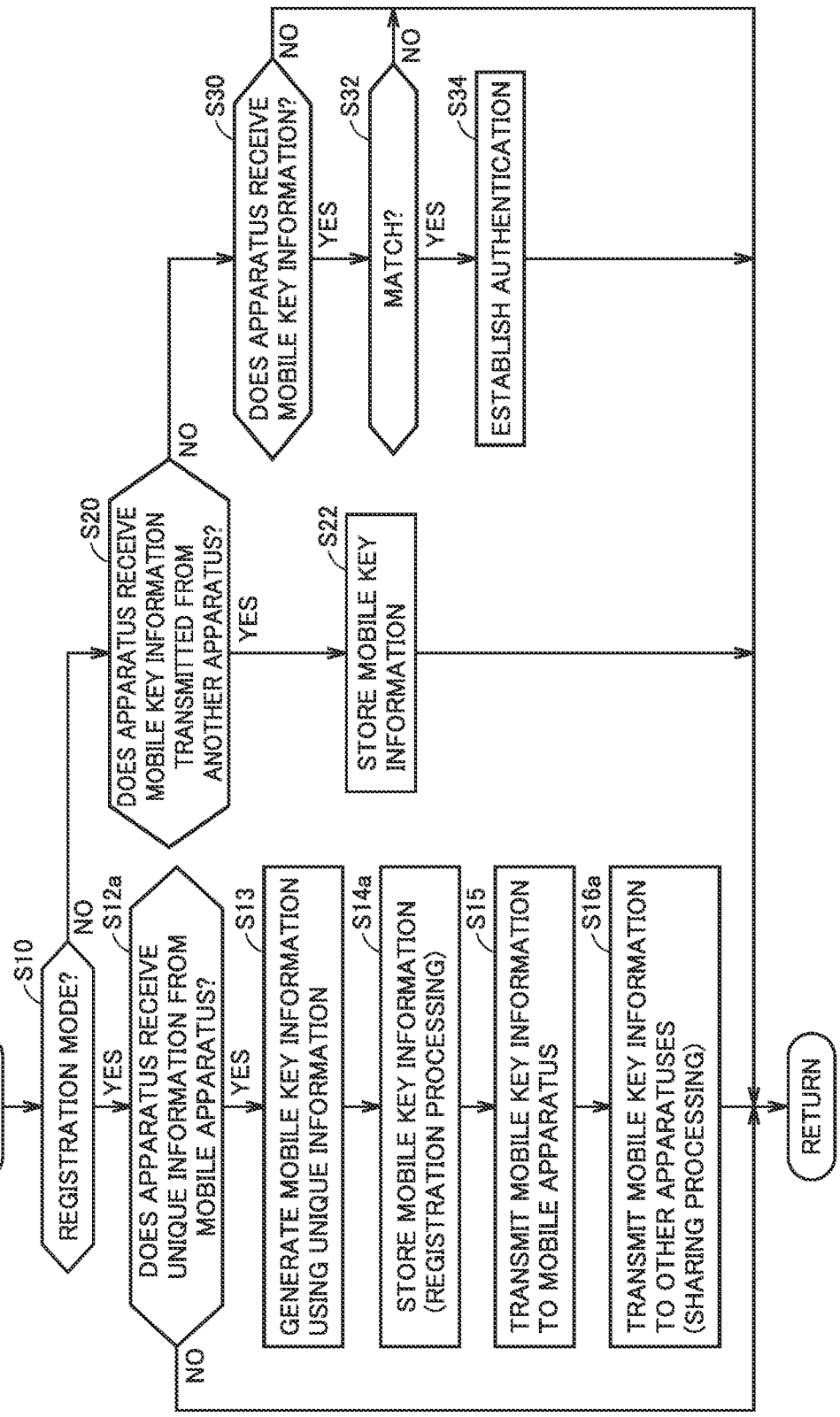

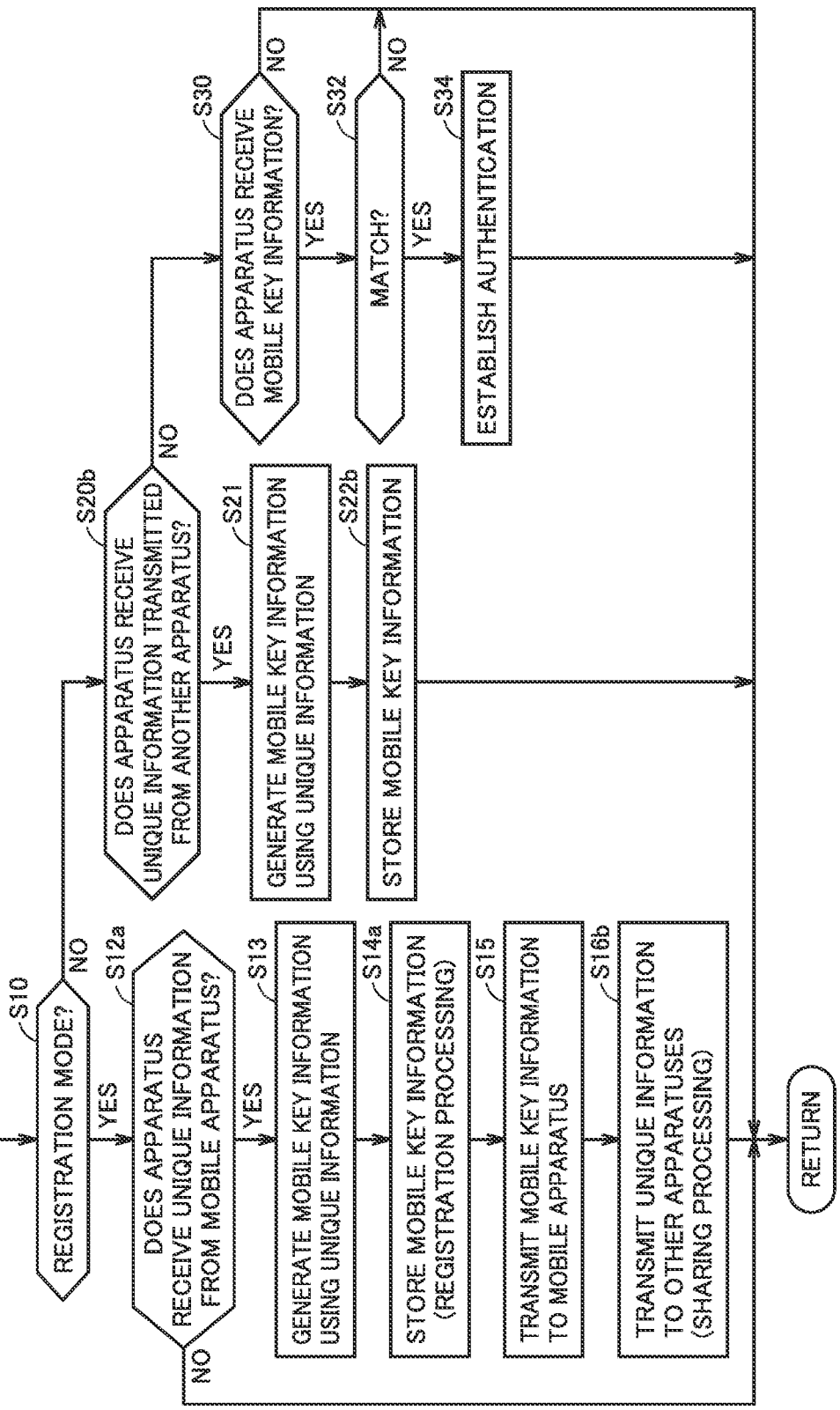

COMMUNICATION SYSTEM

This nonprovisional application is based on Japanese Patent Application No. 2020-051349 filed on Mar. 23, 2020 with the Japan Patent Office, the entire contents of which are hereby incorporated by reference.

BACKGROUND OF THE INVENTION

Field of the Invention

The present disclosure relates to a communication system.

Description of the Background Art

There is known technology for performing such as unlocking and locking of a door of a vehicle, a house, or the like using a mobile apparatus such as a smartphone or a card having a communication function as an electronic key. For example, Japanese Patent Laying-Open No. 2013-100645 discloses a communication system including a mobile apparatus and a vehicle-mounted apparatus that can perform bidirectional communication. In this communication system, wireless communication is performed between the mobile apparatus and the vehicle-mounted apparatus, using short-range wireless communication (for example, wireless communication using a communication method in conformity with the Near Field Communication (NFC) standard; hereinafter also referred to as "NFC communication") or the like, and locking/unlocking of a door of a vehicle and engine start-up are performed using the mobile apparatus as an electronic key.

SUMMARY OF THE INVENTION

When wireless communication is performed between a mobile apparatus and an apparatus, generally, the apparatus performs authentication processing for determining whether the mobile apparatus is a mobile apparatus registered beforehand, and it is permitted to perform predetermined control on the mobile apparatus for which authentication is established.

Generally, registration processing (pairing) for registering a mobile apparatus with an apparatus often involves a manual operation by a user. Therefore, in a case where a user owns a plurality of apparatuses, if the user has to perform the registration processing individually for each of the plurality of apparatuses, the user may feel troublesome.

The present disclosure has been made to solve the aforementioned problem, and an object thereof is to improve user convenience in a communication system including a plurality of apparatuses each performing wireless communication with a mobile apparatus, by reducing the number of times a user performs registration processing for the mobile apparatus.

A communication system in accordance with one aspect of the present disclosure is a communication system that performs wireless communication with a mobile apparatus, the communication system including a plurality of apparatuses each performing authentication processing for determining whether the mobile apparatus is a mobile apparatus registered beforehand. At least one apparatus of the plurality of apparatuses performs registration processing for obtaining authentication information to be used for the authentication processing from the mobile apparatus and registering the authentication information, and sharing processing for sharing information obtained by the registration processing among the plurality of apparatuses.

According to the aspect described above, when the registration processing is performed on one apparatus, the information obtained by that registration processing is shared with a first apparatus not subjected to the registration processing. Accordingly, it is not necessary to perform the registration processing for the mobile apparatus on the first apparatus. As a result, the number of times a user performs the registration processing is reduced, and thus user convenience is improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flowchart (part 1) showing an example of a procedure for the registration processing, the sharing processing, and authentication processing.

FIG. 4 is a flowchart showing an example of a procedure for group setting processing.

FIG. 5 is a flowchart (part 2) showing an example of a procedure for the registration processing, the sharing processing, and the authentication processing.

FIG. 6 is a flowchart (part 3) showing an example of a procedure for the registration processing, the sharing processing, and the authentication processing.

DESCRIPTION OF THE PREFERRED EMBODIMENTS

Figure 1:
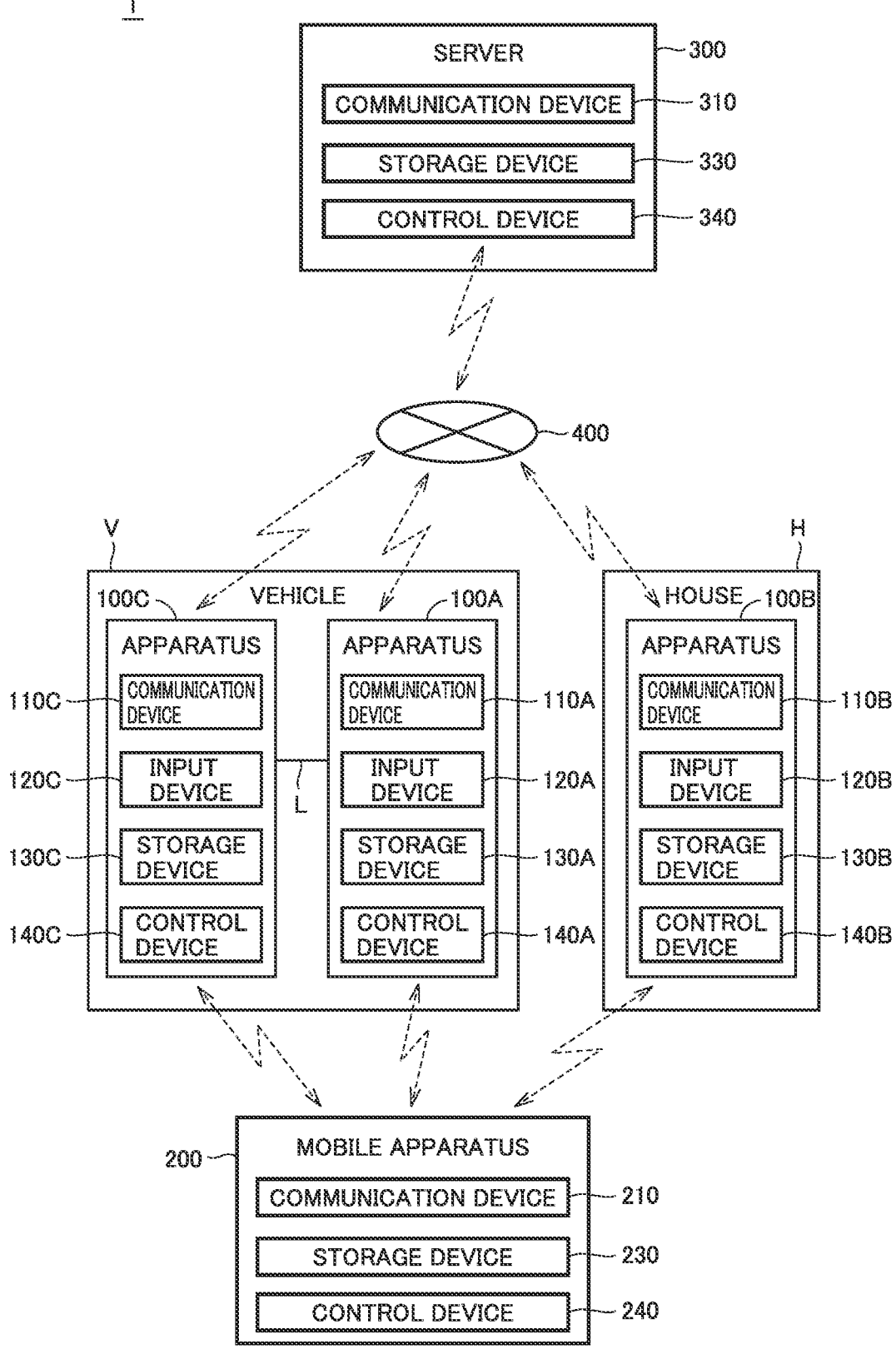
FIG. 1 is a view schematically showing an example of a configuration of a communication system.

Hereinafter, an embodiment of the present disclosure will be described in detail, with reference to the drawings. It should be noted that identical or corresponding parts in the drawings will be designated by the same reference numerals, and the description thereof will not be repeated.

FIG. 1 is a view schematically showing an example of a configuration of a communication system 1 in accordance with the present embodiment. Communication system 1 in accordance with the present embodiment includes a plurality of apparatuses 100A, 100B, and 100C, a mobile apparatus 200, a server 300, and a communication network 400.

Apparatuses 100A and 100C are mounted in a vehicle V. Apparatus 100A has a function of controlling locking and unlocking of an entrance/exit door of vehicle V, for example. Apparatus 100C has a function of performing traveling control of vehicle V (for example, engine start-up), for example. Apparatus 100B is provided in a house H. Apparatus 100B has a function of controlling locking and unlocking of a door of house H, for example. Vehicle V (apparatuses 100A and 100C), house H (apparatus 100B), and mobile apparatus 200 are owned by an identical user.

Apparatus 100A includes a communication device 110A, an input device 120A, a storage device 130A, and a control device 140A. Communication device 110A performs wireless communication with mobile apparatus 200. In addition, communication device 110A performs wired communication with apparatus 100C using a communication line L. In addition, communication device 110A can be connected to communication network 400, and performs wireless communication with apparatus 100B in house H via communication network 400 and server 300.

Input device 120A can accept an operation by the user. Input device 120A outputs information of the inputted operation to control device 140A. The information outputted from input device 120A to control device 140A is used for control by control device 140A.

Storage device 130A stores the information to be used for the control by control device 140A, and the like. The information stored in storage device 130A includes key information to be used for authentication processing for mobile apparatus 200 (i.e., registration key information).

Control device 140A includes a central processing unit (CPU) and an input/output port for inputting/outputting various signals (both not shown). Control device 140A controls locking and unlocking of the entrance/exit door of vehicle V, based on a signal from communication device 110A, the information stored in storage device 130A, and the like. It should be noted that the control performed by control device 140A can be processed not only by software but also by dedicated hardware (electronic circuitry).

Control device 140A performs authentication processing for determining whether mobile apparatus 200 is a mobile apparatus registered beforehand. Then, when mobile apparatus 200 is the mobile apparatus registered beforehand, control device 140A permits to control locking and unlocking of the entrance/exit door of vehicle V according to an operation of the user who possesses mobile apparatus 200. In addition, control device 140A performs registration processing for registering mobile apparatus 200 beforehand, and sharing processing for sharing information obtained by the registration processing with other apparatuses 100B and 100C. The authentication processing, the registration processing, and the sharing processing will be described in detail later.

Apparatus 100C includes a communication device 110C, an input device 120C, a storage device 130C, and a control device 140C. Since the basic functions of communication device 110C, input device 120C, and storage device 130C of apparatus 100C are respectively the same as the basic functions of communication device 110A, input device 120A, and storage device 130A of the apparatus 100A, the detailed description thereof will not be repeated here.

Control device 140C performs the authentication processing for determining whether mobile apparatus 200 is the mobile apparatus registered beforehand. Then, when mobile apparatus 200 is the mobile apparatus registered beforehand, control device 140C permits to perform traveling control of vehicle V (for example, engine start-up) according to an operation of the user who possesses mobile apparatus 200. In addition, control device 140C also has functions of performing the registration processing and the sharing processing described above.

Apparatus 100B includes a communication device 110B, an input device 120B, a storage device 130B, and a control device 140B. Since the basic functions of communication device 110B, input device 120B, and storage device 130B of apparatus 100B are respectively the same as the basic functions of communication device 110A, input device 120A, and storage device 130A of the apparatus 100A, the detailed description thereof will not be repeated here.

Control device 140B performs the authentication processing for determining whether mobile apparatus 200 is the mobile apparatus registered beforehand. Then, when mobile apparatus 200 is the mobile apparatus registered beforehand, control device 140B permits to control locking and unlocking of the door of house H according to an operation of the user who possesses mobile apparatus 200. In addition, control device 140B also has functions of performing the registration processing and the sharing processing described above.

Server 300 includes a communication device 310, a storage device 330, and a control device 340. Communication device 310 can be connected to communication network 400. Therefore, server 300 and each of apparatuses 100A, 100B, and 100C can communicate with each other via communication network 400. Storage device 330 stores information to be used for control by control device 340, and the like. Control device 340 performs control in response to a request from each of apparatuses 100A, 100B, and 100C, based on the information and the like stored in storage device 330.

Mobile apparatus 200 includes a communication device 210, a storage device 230, and a control device 240. Communication device 210 can perform wireless communication with each of apparatuses 100A, 100B, and 100C. Storage device 230 stores information to be used for control by control device 240, and the like. Control device 240 performs predetermined control using the information and the like stored in storage device 330.

Mobile apparatus 200 is possessed by the user, and has a function as an electronic key for performing control of vehicle V and house H. Mobile apparatus 200 can be realized, for example, by a card having an NFC communication function (an NFC card), a smartphone having the NFC communication function or a communication function other than NFC (such as Bluetooth Low Energy (BLE), for example), or the like. When mobile apparatus 200 is realized by a smartphone, mobile apparatus 200 is further provided with an input device and display device like a touch panel.

When mobile apparatus 200 is realized by an NFC card, mobile apparatus 200 has at least a card emulation function, of the NFC communication function. The card emulation function is a passive-type communication function. When mobile apparatus 200 is located within an NFC communicable range (a narrow range of about several centimeters) of apparatus 100A, 100B, or 100C, mobile apparatus 200 obtains power from an electric wave received from apparatus 100A, 100B, or 100C and is activated, and outputs an electric wave including the information stored in storage device 230.

(Authentication Processing, Registration Processing, and Sharing Processing)

The information stored in storage device 230 of mobile apparatus 200 includes key information unique to mobile apparatus 200 (hereinafter also referred to as "mobile key information") to be used for communication with each of apparatuses 100A, 100B, and 100C. When each of apparatuses 100A, 100B, and 100C performs wireless communication with mobile apparatus 200, each apparatus obtains the mobile key information from mobile apparatus 200, and performs the "authentication processing" for determining whether mobile apparatus 200 is the mobile apparatus registered beforehand, using the obtained mobile key information.

For example, in a case where apparatus 100A obtains the mobile key information from mobile apparatus 200, in the authentication processing, apparatus 100A determines whether the mobile key information obtained from mobile apparatus 200 matches key information stored beforehand in storage device 130A thereof (hereinafter also referred to as "registration key information"), and when the mobile key information matches the registration key information, apparatus 100A determines that authentication of mobile apparatus 200 is established (that is, mobile apparatus 200 is the mobile apparatus registered beforehand). When authentication of mobile apparatus 200 is established, apparatus 100A permits to control locking and unlocking of the entrance/exit door of vehicle V according to an operation of the user who possesses mobile apparatus 200. It should be noted that the authentication processing performed by other apparatuses 100B and 100C is the same as the authentication processing performed by apparatus 100A.

As described above, in the authentication processing for mobile apparatus 200 performed by each of apparatuses 100A, 100B, and 100C, the registration key information stored in each of storage devices 130A, 130B, and 130C of apparatuses 100A, 100B, and 100C, respectively, is used. Therefore, in order to obtain authentication of mobile apparatus 200 in each of apparatuses 100A, 100B, and 100C, it is necessary to store beforehand the mobile key information obtained from mobile apparatus 200 as the registration key information in each of storage devices 130A, 130B, and 130C of apparatuses 100A, 100B, and 100C, respectively.

The user can set a control mode of each of apparatuses 100A, 100B, and 100C to a "registration mode" by operating each of input devices 120A, 120B, and 120C of apparatuses 100A, 100B, and 100C, respectively. When the control mode of each of apparatuses 100A, 100B, and 100C is set to the "registration mode", each of apparatuses 100A, 100B, and 100C performs wireless communication with mobile apparatus 200 to obtain the mobile key information from mobile apparatus 200, and performs the "registration processing" (pairing) for registering the obtained mobile key information.

This registration processing involves a manual operation (such as an operation to set to the registration mode) by the user. Therefore, if the user has to perform the registration processing individually for each of the plurality of apparatuses 100A, 100B, and 100C, the user may feel troublesome.

Accordingly, in communication system 1 in accordance with the present embodiment, when the registration processing for mobile apparatus 200 is performed on one of apparatuses 100A, 100B, and 100C, the apparatus subjected to the registration processing performs the "sharing processing" for sharing the information of mobile apparatus 200 obtained by the registration processing with the other apparatuses not subjected to the registration processing. Thereby, the user does not have to perform the registration processing for mobile apparatus 200 on the other apparatuses. As a result, the number of times the user performs the registration processing for mobile apparatus 200 is reduced, and thus user convenience can be improved.

Figure 2:
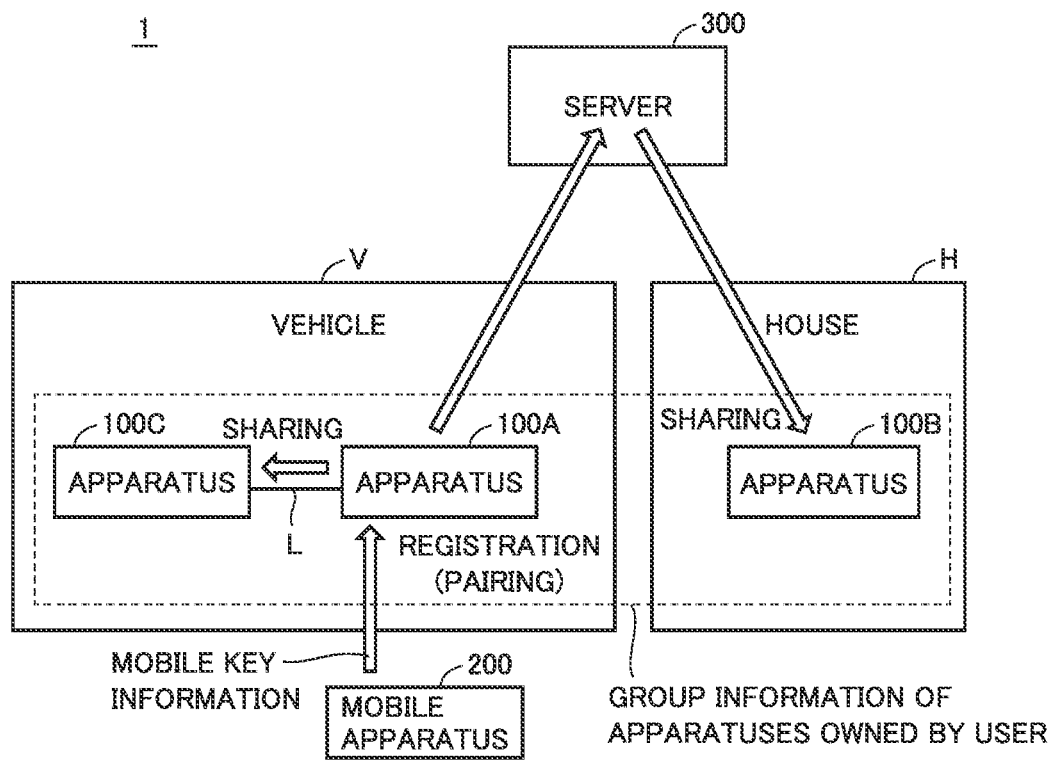
FIG. 2 is a view schematically showing a flow of key information by registration processing and sharing processing.

FIG. 2 is a view schematically showing a flow of the key information by the registration processing and the sharing processing. FIG. 2 illustrates a case where apparatus 100A performs the registration processing and the sharing processing.

When the user sets the control mode of apparatus 100A to the registration mode and places mobile apparatus 200 within the communicable range of apparatus 100A, apparatus 100A starts the registration processing for mobile apparatus 200. In the registration processing, apparatus 100A performs wireless communication with mobile apparatus 200 to obtain the mobile key information from mobile apparatus 200, and stores the obtained mobile key information in storage device 130A thereof, as the registration key information. Thereby, mobile apparatus 200 is registered (paired) with apparatus 100A.

Further, apparatus 100A transmits the mobile key information obtained from mobile apparatus 200 by the registration processing, to other apparatuses 100B and 100C owned by the user. This processing corresponds to the "sharing processing".

Information for specifying apparatuses 100A, 100B, and 100C owned by the user (hereinafter also referred to as "group information") is set beforehand by the user. The group information set by the user is stored in at least one of server 300 and apparatuses 100A, 100B, and 100C. That is, the group information may be stored in one of server 300 and apparatuses 100A, 100B, and 100C, or may be stored redundantly in each of server 300 and apparatuses 100A, 100B, and 100C. Thereby, the user can select a location for storing the group information, from among server 300 and apparatuses 100A, 100B, and 100C.

It should be noted that, when the group information is stored in server 300, it is desirable that the group information is stored with a user ID for specifying the user. Thereby, server 300 can manage the group information for each user ID.

In the sharing processing, apparatus 100A accesses the group information to specify other apparatuses 100B and 100C belonging to the same group as itself, and transmits the mobile key information to specified apparatuses 100B and 100C. In the example shown in FIG. 2, apparatus 100A transmits the mobile key information obtained from mobile apparatus 200 by the registration processing to apparatus 100C within vehicle V, by wired communication using communication line L. In addition, apparatus 100A transmits the mobile key information obtained from mobile apparatus 200 by the registration processing to apparatus 100B within house H, by wireless communication via server 300. Accordingly, even when it is not possible to establish direct communication between apparatus 100A and apparatus 100B, it is possible to transmit the mobile key information from apparatus 100A to apparatus 100B via server 300.

It should be noted that the group information may be stored in a divided manner in two or more of server 300 and apparatuses 100A, 100B, and 100C. For example, information of apparatuses 100A and 100C mounted in vehicle V may be stored in apparatus 100A, and information of apparatus 100B provided in house H may be stored in server 300. In this case, in the sharing processing, apparatus 100A may transmit the mobile key information to server 300 without specifying apparatus 100B. That is, server 300 may specify apparatus 100B owned by the same user who owns apparatus 100A, and may output the mobile key information obtained from apparatus 100A to apparatus 100B.

Other apparatuses 100B and 100C store the mobile key information received from apparatus 100A in storage devices 130B and 130C thereof, respectively, as the registration key information of mobile apparatus 200. Thereby, the user only has to perform the registration processing for mobile apparatus 200 on apparatus 100A, and thus mobile apparatus 200 is automatically registered with other apparatuses 100B and 100C. Accordingly, the user does not have to perform the registration processing for mobile apparatus 200 on other apparatuses 100B and 100C. As a result, the number of times the user performs the registration processing is reduced, and thus user convenience is improved.

FIG. 3 is a flowchart showing an example of a procedure for the registration processing, the sharing processing, and the authentication processing described above. This flowchart is repeatedly performed by each of control devices 140A, 140B, and 140C of apparatuses 100A, 100B, and 100C, respectively, whenever a predetermined condition is satisfied (for example, at each predetermined cycle). In the following, any one of apparatuses 100A, 100B, and 100C will also be described as "apparatus 100".

First, apparatus 100 performs the registration processing described above (steps S10, S12, and S14). Specifically, first, apparatus 100 determines whether the control mode thereof is set to the registration mode by a manual operation of the user (step S10) When the control mode of apparatus 100 is set to the registration mode (YES in step S10), apparatus 100 determines whether it receives the mobile key information from mobile apparatus 200 (step S12). When apparatus 100 does not receive the mobile key information from mobile apparatus 200 (NO in step S12), apparatus 100 skips the subsequent processing and moves the processing to RETURN. On the other hand, when apparatus 100 receives the mobile key information from mobile apparatus 200 (YES in step S12), apparatus 100 stores the mobile key information received from mobile apparatus 200 in the storage device thereof, as the registration key information (step S14).

After performing step S14, apparatus 100 performs the sharing processing described above (step S16). Specifically, apparatus 100 accesses the group information described above to specify other apparatuses belonging to the same group as itself, and transmits the mobile key information received from mobile apparatus 200 to the specified other apparatuses.

On the other hand, when the control mode of apparatus 100 is not set to the registration mode (NO in step S10), apparatus 100 determines whether it receives the mobile key information transmitted from another apparatus in the group by the sharing processing (step S20). When apparatus 100 receives the mobile key information transmitted from the other apparatus by the sharing processing (YES in step S20), apparatus 100 stores the mobile key information received from the other apparatus in the storage device thereof, as the registration key information (step S22). It is not necessary to perform the registration processing involving a manual operation of the user on mobile apparatus 200 having the mobile key information stored by this processing in step S22.

When apparatus 100 does not receive the mobile key information from the other apparatus in the group (NO in step S20), apparatus 100 performs the authentication processing for mobile apparatus 200 (steps S30, S32, and S34). Specifically, apparatus 100 determines whether it receives the mobile key information from mobile apparatus 200 (step S30). When apparatus 100 receives the mobile key information from mobile apparatus 200 (YES step S30), apparatus 100 determines whether the mobile key information received from mobile apparatus 200 matches the registration key information stored in the storage device thereof (step S32). When the mobile key information matches the registration key information (YES in step S32), apparatus 100 determines that authentication of mobile apparatus 200 is established (step S34). When it is determined that authentication of mobile apparatus 200 is established, it is permitted to perform predetermined control in apparatus 100 according to an operation of the user who possesses mobile apparatus 200.

(Group Setting Processing)

Next, processing for setting the apparatuses owned by the user as a group (hereinafter also referred to as "group setting processing") will be described.

FIG. 4 is a flowchart showing an example of a procedure for the group setting processing. This flowchart is repeatedly performed by at least one of server 300 and apparatus 100 whenever a predetermined condition is satisfied (for example, at each predetermined cycle). A description will be given below of an example where apparatus 100 performs the processing shown in FIG. 4. In the following, an input device and a storage device provided to apparatus 100 will also be described as an input device 120 and a storage device 130, respectively.

Apparatus 100 determines whether a request by the user to set a new group is inputted to input device 120 (step S50).

When a request to set a new group is inputted (YES in step S50), apparatus 100 performs processing for setting a new group (step S52). For example, apparatus 100 newly sets group information for the user ID inputted by the user to input device 120.

Then, apparatus 100 performs processing for setting information of an apparatus which is to belong to the new group (step S54). For example, apparatus 100 stores address information of an apparatus inputted by the user to input device 120, as the information of the apparatus which is to belong to the new group. Thereby, the group information is newly set.

When a request to set a new group is not inputted (NO in step S50), apparatus 100 determines whether a request by the user to add an apparatus is inputted to input device 120 (step S60).

When a request to add an apparatus is inputted (YES in step S60), apparatus 100 performs processing for designating a group to which an apparatus is to be added (step S62). For example, apparatus 100 sets a group corresponding to the user ID inputted by the user to input device 120, as a designated group to which an apparatus is to be added.

Then, apparatus 100 performs processing for adding an apparatus to the designated group (step S64). For example, apparatus 100 adds information of an apparatus inputted by the user to input device 120, to information of the designated group. Thereby, information of a new apparatus is added to the existing group information.

Then, apparatus 100 determines whether there is registration key information already held by an apparatus belonging to the designated group (step S66). When there is no registration key information held by an apparatus belonging to the designated group (NO in step S66), apparatus 100 skips the subsequent processing and moves the processing to RETURN.

When there is registration key information already held by an apparatus belonging to the designated group (YES in step S66), apparatus 100 transmits the registration key information already held by the apparatus belonging to the designated group, to the apparatus newly added to the designated group (step S68). Thereby, the user does not have to register mobile apparatus 200 already registered with the apparatus belonging to the designated group, again with the apparatus added to the designated group. As a result, the number of times the user performs the registration processing is reduced, and thus user convenience is improved.

When a request to add an apparatus is not inputted (NO in step S60), apparatus 100 determines whether a request by the user to delete an apparatus is inputted to input device 120 (step S70). When a request to delete an apparatus is not inputted (NO in step S70), apparatus 100 skips the subsequent processing and moves the processing to RETURN.

When a request to delete an apparatus is inputted (YES in step S70), apparatus 100 performs processing for designating a group from which an apparatus is to be deleted (step S72). For example, apparatus 100 sets a group corresponding to the user ID inputted by the user to input device 120, as a designated group from which an apparatus is to be deleted.

Then, apparatus 100 performs processing for deleting an apparatus from the designated group (step S74) For example, apparatus 100 deletes information of an apparatus inputted by the user to input device 120, from information of the designated group.

As described above, communication system 1 in accordance with the present embodiment performs wireless communication with mobile apparatus 200. This communication system 1 includes the plurality of apparatuses 100A, 100B, and 100C set beforehand as belonging to the same group. Each of apparatuses 100A, 100B, and 100C performs the authentication processing for determining whether mobile apparatus 200 is the mobile apparatus registered beforehand. Further, each of apparatuses 100A, 100B, and 100C performs the registration processing for obtaining the mobile key information as the authentication information to be used for the authentication processing from mobile apparatus 200 and registering the mobile key information, and the sharing processing for sharing the mobile key information obtained by the registration processing with the other apparatuses in the same group.

Thereby, when the registration processing is performed on one apparatus, the mobile key information obtained by that registration processing is shared with the other apparatuses not subjected to the registration processing. Accordingly, it is not necessary to perform the registration processing for mobile apparatus 200 on the other apparatuses. As a result, the number of times the user performs the registration processing is reduced, and thus user convenience is improved.

[First Variation]

Apparatus 100 in accordance with the embodiment described above obtains, in the registration processing, the "mobile key information" as the authentication information to be used for the authentication processing, from mobile apparatus 200.

In contrast, apparatus 100 in accordance with a first variation obtains, in the registration processing, "unique information" (such as a unique code or a random number) to be used to generate the mobile key information, rather than the mobile key information itself to be used for the authentication processing, from mobile apparatus 200. Thereby, the risk of leakage of the mobile key information in the registration processing can be reduced.

In addition, in the registration processing, apparatus 100 in accordance with the first variation generates the mobile key information by a specific algorithm using the unique information obtained from mobile apparatus 200, stores the generated mobile key information in storage device 130 thereof as the registration key information, and transmits the generated mobile key information to mobile apparatus 200. Thereby, the mobile key information generated using the unique information obtained from the mobile apparatus can be shared among apparatuses 100A, 100B, and 100C, as the authentication information to be used for the authentication processing.

FIG. 5 is a flowchart showing an example of a procedure for the registration processing, the sharing processing, and the authentication processing in accordance with the first variation. The flowchart shown in FIG. 5 includes steps S12a, S13, S14a, S15, and S16a, instead of steps S12, S14, and S16 shown in FIG. 3. Since the other steps in FIG. 5 (i.e., the steps designated by the same reference numerals as those shown in FIG. 3 described above) have been already described, the detailed description thereof will not be repeated here.

When the control mode of apparatus 100 is set to the registration mode (YES in step S10), apparatus 100 determines whether it receives the unique information from mobile apparatus 200 (step S12a). When apparatus 100 does not receive the unique information from mobile apparatus 200 (NO in step S12a), apparatus 100 skips the subsequent processing and moves the processing to RETURN.

When apparatus 100 receives the unique information from mobile apparatus 200 (YES in step S12a), apparatus 100 generates the mobile key information by a specific algorithm using the unique information received from mobile apparatus 200 (step S13). Apparatus 100 stores the mobile key information generated in step S13 in storage device 130 thereof, as the registration key information (step S14a). The processing in steps S10, S12a, S13, and S14a corresponds to the "registration processing" in the first variation.

Then, apparatus 100 transmits the mobile key information generated in step S13 to mobile apparatus 200 (step S15). The mobile key information transmitted from apparatus 100 to mobile apparatus 200 is stored in storage device 230 of mobile apparatus 200, and is used for the subsequent authentication processing.

Then, apparatus 100 transmits the mobile key information generated in step S13 to other apparatuses belonging to the same group as itself (step S16a). The processing in step S16a corresponds to the "sharing processing" in the first variation.

As described above, the authentication information obtained by apparatus 100 from mobile apparatus 200 in the registration processing may be the "unique information" to be indirectly used for the authentication processing (i.e., to be used to generate the mobile key information), rather than the "mobile key information" to be directly used for the authentication processing.

[Second Variation]

Apparatus 100 in accordance with the first variation described above transmits, in the sharing processing, the "mobile key information" generated using the unique information obtained from mobile apparatus 200 to the other apparatuses belonging to the same group.

In contrast, apparatus 100 in accordance with a second variation transmits, in the sharing processing, the unique information obtained from mobile apparatus 200 to the other apparatuses belonging to the same group. Then, each apparatus 100 generates the mobile key information by a specific algorithm using the unique information, and stores the generated mobile key information as the registration key information. Thereby, the mobile key information generated by the common algorithm using the common unique information can be registered with each apparatus 100.

FIG. 6 is a flowchart showing an example of a procedure for the registration processing, the sharing processing, and the authentication processing in accordance with the second variation. The flowchart shown in FIG. 6 includes steps S16b, S20b, and S22b, instead of steps S16a, S20, and S22, respectively, shown in FIG. 5 described above, and further includes step S21. Since the other steps in FIG. 6 (i.e., the steps designated by the same reference numerals as those shown in FIG. 5 described above) have been already described, the detailed description thereof will not be repeated here.

After the processing in step S15, apparatus 100 transmits the unique information obtained from mobile apparatus 200 to the other apparatuses belonging to the same group (step S16b). The processing in step S16b corresponds to the "sharing processing" in the second variation.

On the other hand, when the control mode of apparatus 100 is not set to the registration mode (NO in step S10), apparatus 100 determines whether it receives the unique information transmitted from another apparatus in the group by the sharing processing (step S20b). When apparatus 100 receives the unique information transmitted from the other apparatus by the sharing processing (YES in step S20b), apparatus 100 generates the mobile key information by the specific algorithm (the same algorithm as the algorithm used in step S13) using the unique information received from the other apparatus (step S21). Therefore, in step S21, the same mobile key information as the mobile key information generated in step S13 is generated. Then, apparatus 100 stores the mobile key information generated in step S21 in storage device 130 thereof, as the registration key information (step S22b). It is not necessary to perform the registration processing on mobile apparatus 200 having the mobile key information stored by this processing in step S22b.

As described above, apparatus 100 may transmit, in the sharing processing, the unique information obtained from mobile apparatus 200 to the other apparatuses belonging to the same group.

[Third Variation]

Although all apparatuses 100A, 100B, and 100C belonging to the same group can perform the sharing processing in the first embodiment described above, it is only necessary that at least some of the apparatuses belonging to the same group can perform the sharing processing. For example, of apparatuses 100A, 100B, and 100C, only apparatus 100A may be allowed to perform the sharing processing. In this case, by performing the registration processing for mobile apparatus 200 using apparatus 100A, the user can omit to perform the registration processing on other apparatuses 100B and 100C.

The embodiment and the first to third variations thereof described above can also be combined as appropriate within the scope in which no technical inconsistency arises.

It should be understood that the embodiment disclosed herein is illustrative and non-restrictive in every respect. The scope of the present disclosure is defined by the scope of the claims, rather than the description above, and is intended to include any modifications within the scope and meaning equivalent to the scope of the claims.

The illustrative embodiment and the variations thereof described above are specific examples of aspects described below.

(1) A control system in accordance with one aspect of the present disclosure is a communication system that performs wireless communication with a mobile apparatus, the communication system including a plurality of apparatuses each performing authentication processing for determining whether the mobile apparatus is a mobile apparatus registered beforehand. At least one apparatus of the plurality of apparatuses performs registration processing for obtaining authentication information to be used for the authentication processing from the mobile apparatus and registering the authentication information, and sharing processing for sharing information obtained by the registration processing among the plurality of apparatuses.

According to the aspect described above, when the registration processing is performed on one apparatus, the information obtained by that registration processing is shared with a first apparatus not subjected to the registration processing. Accordingly, it is not necessary to perform the registration processing for the mobile apparatus on the first apparatus. As a result, the number of times a user performs the registration processing is reduced, and thus user convenience is improved.

(2) In an aspect, in the authentication processing, each of the plurality of apparatuses obtains mobile key information from the mobile apparatus, and determines, when the obtained mobile key information matches registration key information stored beforehand, that authentication of the mobile apparatus is established. The authentication information is the mobile key information.

According to the aspect described above, the mobile key information obtained from the mobile key information can be shared among the plurality of apparatuses.

(3) In an aspect, the plurality of apparatuses belong to a specific group. The at least one apparatus stores the mobile key information obtained from the mobile apparatus as the registration key information, in the registration processing. The at least one apparatus transmits the mobile key information obtained from the mobile apparatus by the registration processing to a first apparatus belonging to the specific group, in the sharing processing. The first apparatus stores the mobile key information received from the at least one apparatus as the registration key information.

According to the aspect described above, by performing the registration processing on one apparatus of the plurality of apparatuses belonging to the specific group, the mobile key information obtained by that registration processing can be shared with the first apparatus belonging to the specific group.

(4) In an aspect, the communication system further includes a server that can perform wireless communication with the at least one apparatus and the first apparatus. The at least one apparatus transmits the mobile key information to the first apparatus via the server, in the sharing processing.

According to the aspect described above, even when it is not possible to establish direct communication between the at least one apparatus and the first apparatus, it is possible to transmit the mobile key information from the at least one apparatus to the first apparatus via the server.

(5) In an aspect, group information is stored in at least one of the server and a second apparatus in the plurality of apparatuses, the group information being information for specifying the apparatuses belonging to the specific group.

According to the aspect described above, the user can select a location for storing the group information, from among the server and the second apparatus in the plurality of apparatuses.

(6) In an aspect, when a third apparatus is added to the specific group, the server or the second apparatus that stores the group information transmits the mobile key information shared in the specific group to the third apparatus.

According to the aspect described above, the user does not have to register the mobile key information already registered with the apparatus belonging to the specific group, again with the third apparatus added to the specific group. As a result, the number of times the user performs the registration processing is reduced, and thus user convenience is improved.

(7) In an aspect, in the authentication processing, each of the plurality of apparatuses obtains mobile key information from the mobile apparatus, and determines, when the obtained mobile key information matches registration key information stored beforehand, that authentication of the mobile apparatus is established. The authentication information is unique information to be used to generate the mobile key information to be used for the authentication processing.

According to the aspect described above, in the registration processing, each of the plurality of apparatuses obtains the unique information to be used to generate the mobile key information, rather than the mobile key information to be directly used for the authentication processing, from the mobile apparatus. Thus, the risk of leakage of the mobile key information in the registration processing can be reduced.

(8) In an aspect, the plurality of apparatuses belong to a specific group. The at least one apparatus obtains the unique information from the mobile apparatus, generates the mobile key information using the obtained unique information, stores the generated mobile key information as the registration key information, and transmits the generated mobile key information to the mobile apparatus, in the registration processing. The at least one apparatus transmits the mobile key information generated by the registration processing to a first apparatus belonging to the specific group, in the sharing processing. The first apparatus stores the mobile key information received from the at least one apparatus as the registration key information.

According to the aspect described above, the mobile key information generated using the unique information obtained from the mobile apparatus can be shared among the plurality of apparatuses.

(9) In an aspect, the plurality of apparatuses belong to a specific group. The at least one apparatus obtains the unique information from the mobile apparatus, generates the mobile key information by a specific algorithm using the obtained unique information, stores the generated mobile key information as the registration key information, and transmits the generated mobile key information to the mobile apparatus, in the registration processing. The at least one apparatus transmits the unique information obtained from the mobile apparatus by the registration processing to a first apparatus belonging to the specific group, in the sharing processing. The first apparatus generates the mobile key information by the specific algorithm using the unique information received from the at least one apparatus, and stores the generated mobile key information as the registration key information.

According to the aspect described above, the mobile key information generated by the common algorithm using the common unique information can be registered with each of the plurality of apparatuses.

Although the embodiment of the present invention has been described, it should be understood that the embodiment disclosed herein is illustrative and non-restrictive in every respect. The scope of the present invention is defined by the scope of the claims, and is intended to include any modifications within the scope and meaning equivalent to the scope of the claims.

What is claimed is:

1. A communication system that performs wireless communication with a mobile apparatus, the communication system comprising:
    a plurality of apparatuses each performing authentication processing for determining whether the mobile apparatus is a mobile apparatus registered beforehand,
    at least one apparatus of the plurality of apparatuses performing
        registration processing for obtaining authentication information to be used for the authentication processing from the mobile apparatus, and registering the authentication information, and
        sharing processing for sharing information obtained by the registration processing among the plurality of apparatuses; and
    wherein when only one apparatus of the plurality of apparatuses is manually set to a registration mode, the only one apparatus subjected to the registration mode performs the sharing processing for sharing registration information obtained from the mobile apparatus with all of the plurality of apparatuses that were not manually set to the registration mode.

2. The communication system according to claim 1,
    wherein in the authentication processing, each of the plurality of apparatuses obtains mobile key information from the mobile apparatus, and determines, when the obtained mobile key information matches registration key information stored beforehand, that authentication of the mobile apparatus is established, and
    the authentication information is the mobile key information.

3. The communication system according to claim 2,
    wherein the plurality of apparatuses belong to a specific group,
    the at least one apparatus
        stores the mobile key information obtained from the mobile apparatus as the registration key information, in the registration processing, and
        transmits the mobile key information obtained from the mobile apparatus by the registration processing to a first apparatus belonging to the specific group, in the sharing processing, and
    the first apparatus stores the mobile key information received from the at least one apparatus as the registration key information.

4. The communication system according to claim 3, further comprising:
    a server that can perform wireless communication with the at least one apparatus and the first apparatus,
    wherein the at least one apparatus transmits the mobile key information to the first apparatus via the server, in the sharing processing.

5. The communication system according to claim 4,
    wherein group information is stored in at least one of the server and a second apparatus in the plurality of apparatuses, the group information being information for specifying the apparatuses belonging to the specific group.

6. The communication system according to claim 5,
    wherein, when a third apparatus is added to the specific group, the server or the second apparatus that stores the group information transmits the mobile key information shared in the specific group to the third apparatus.

7. The communication system according to claim 1,
    wherein in the authentication processing, each of the plurality of apparatuses obtains mobile key information from the mobile apparatus, and determines, when the obtained mobile key information matches registration key information stored beforehand, that authentication of the mobile apparatus is established, and
    the authentication information is unique information to be used to generate the mobile key information to be used for the authentication processing.

8. The communication system according to claim 7,
    wherein the plurality of apparatuses belong to a specific group,
    the at least one apparatus
        obtains the unique information from the mobile apparatus, generates the mobile key information using the obtained unique information, stores the generated mobile key information as the registration key information, and transmits the generated mobile key information to the mobile apparatus, in the registration processing, and transmits the mobile key information generated by the registration processing to a first apparatus belonging to the specific group, in the sharing processing, and the first apparatus stores the mobile key information received from the at least one apparatus as the registration key information.

9. The communication system according to claim 7, wherein the plurality of apparatuses belong to a specific group, the at least one apparatus obtains the unique information from the mobile apparatus, generates the mobile key information by a specific algorithm using the obtained unique information, stores the generated mobile key information as the registration key information, and transmits the generated mobile key information to the mobile apparatus, in the registration processing, and transmits the unique information obtained from the mobile apparatus by the registration processing to a first apparatus belonging to the specific group, in the sharing processing, and the first apparatus generates the mobile key information by the specific algorithm using the unique information received from the at least one apparatus, and stores the generated mobile key information as the registration key information.

* * * * *